United States Patent
Neumann et al.

(10) Patent No.: US 9,734,325 B1
(45) Date of Patent: Aug. 15, 2017

(54) HYPERVISOR-BASED BINDING OF DATA TO CLOUD ENVIRONMENT FOR IMPROVED SECURITY

(71) Applicant: Raytheon Company, Waltham, MA (US)

(72) Inventors: Matthew D. Neumann, Rowlett, TX (US); Irby J. Thompson, Jr., Washington, DC (US); Michael Simms, Indialantic, FL (US)

(73) Assignee: Forcepoint Federal LLC, Herndon, VA (US)

( * ) Notice: Subject to any disclaimer, the term of this patent is extended or adjusted under 35 U.S.C. 154(b) by 118 days.

(21) Appl. No.: 14/101,166

(22) Filed: Dec. 9, 2013

(51) Int. Cl.
*G06F 21/52* (2013.01)
*H04L 9/08* (2006.01)
(Continued)

(52) U.S. Cl.
CPC .......... *G06F 21/52* (2013.01); *G06F 9/45558* (2013.01); *G06F 21/629* (2013.01);
(Continued)

(58) Field of Classification Search
CPC ........ G06F 21/12; G06F 21/121; G06F 21/44; G06F 21/45; G06F 21/50; G06F 21/51; G06F 21/53; G06F 21/57; G06F 21/575; G06F 21/602; G06F 21/62; G06F 21/6209; G06F 21/6218; G06F 21/70; G06F 21/71; G06F 21/72; G06F 21/73; G06F 21/82; G06F 21/85; G06F 2221/033; G06F 2221/034; G06F 2221/0702;
(Continued)

(56) References Cited

U.S. PATENT DOCUMENTS 7,219,219 B1   5/2007  Wisor
8,176,336 B1 * 5/2012  Mao ................. H04L 9/006
                                              713/189

(Continued)

OTHER PUBLICATIONS

International Search Report dated Sep. 26, 2013 in connection with International Patent Application No. PCT/US2013/046481, 5 pages.
(Continued)

*Primary Examiner* — Robert Leung

(57) ABSTRACT

A method includes receiving a request at a first hypervisor from an application within a virtual machine. The virtual machine is executed within a virtualization layer supported by a second hypervisor, and the virtual machine and the hypervisors are executed by a computing node. The method also includes interrupting execution of the application and determining an authorization key using hashing operations performed by the first hypervisor based on measurements associated with the computing node and data associated with the first hypervisor. The method further includes storing the authorization key and resuming execution of the application. In addition, the method could include performing the receiving, interrupting, determining, storing, and resuming steps at each of multiple computing nodes in a computing cloud, where each computing node executes first and second hypervisors. The first hypervisors in the computing nodes can bind the virtual machine to the computing cloud.

21 Claims, 4 Drawing Sheets

(51) Int. Cl.
*G06F 21/62* (2013.01)
*G06F 9/455* (2006.01)

(52) U.S. Cl.
CPC .......... *H04L 9/0866* (2013.01); *H04L 9/0877* (2013.01); *G06F 2009/45587* (2013.01)

(58) Field of Classification Search
CPC ..... G06F 2221/0704; G06F 2221/0706; G06F 2221/0751; G06F 2221/0755; G06F 2221/0773; G06F 2221/0797; G06F 2221/2129; G06F 2221/2139; G06F 2221/2153; G06F 9/455; G06F 9/45533; G06F 9/45541; G06F 9/45545; G06F 9/45558; G06F 2009/4557; G06F 2009/45575; G06F 2009/45583; G06F 2009/45587; G06F 2009/45595; G06F 2211/002; G06F 2211/009; G06F 2212/151; G06F 2212/152; G06F 2213/0024; G06F 2213/0026; G06F 2213/0052; G06F 2213/0058; G06F 21/52; G06F 21/629; H04L 9/08; H04L 9/0816; H04L 9/0819; H04L 9/0822; H04L 9/0861; H04L 9/0866; H04L 9/0877; H04L 9/0894; H04L 9/0897; H04L 9/32; H04L 9/3223; H04L 9/3234; H04L 9/3236; H04L 9/3239; H04L 9/3242; H04L 2209/127; H04L 63/06; H04L 63/08; H04L 63/0853; H04L 63/0876; H04L 63/12; H04L 63/123; H04L 63/126; H04L 63/20; H04L 2463/081; H04L 67/10; H04L 67/141
See application file for complete search history.

(56) References Cited

U.S. PATENT DOCUMENTS

| | | | |
|---|---|---|---|
| 8,826,273 B1 | 9/2014 | Chen | |
| 8,910,238 B2 | 12/2014 | Lukacs et al. | |
| 2005/0086523 A1 | 4/2005 | Zimmer et al. | |
| 2006/0053492 A1 | 3/2006 | Wallace | |
| 2008/0077993 A1* | 3/2008 | Zimmer | G06F 9/5077 726/27 |
| 2009/0007100 A1 | 1/2009 | Field et al. | |
| 2009/0055693 A1* | 2/2009 | Budko | G06F 21/53 714/57 |
| 2009/0119538 A1 | 5/2009 | Scales et al. | |
| 2009/0300076 A1 | 12/2009 | Freidman et al. | |
| 2010/0088745 A1 | 4/2010 | Song et al. | |
| 2010/0281273 A1* | 11/2010 | Lee | G06F 21/72 713/190 |
| 2011/0047543 A1 | 2/2011 | Mohinder | |
| 2011/0060947 A1* | 3/2011 | Song | G06F 21/53 714/37 |
| 2011/0082962 A1 | 4/2011 | Horovitz et al. | |
| 2011/0185417 A1 | 7/2011 | Zhou et al. | |
| 2011/0197205 A1 | 8/2011 | Wagner et al. | |
| 2011/0265081 A1* | 10/2011 | Lucovsky | G06F 8/60 717/177 |
| 2011/0265182 A1 | 10/2011 | Pienado et al. | |
| 2011/0302415 A1* | 12/2011 | Ahmad | G06F 21/57 713/168 |
| 2012/0011509 A1 | 1/2012 | Husain | |
| 2012/0030672 A1* | 2/2012 | Zygmuntowicz | G06F 8/60 718/1 |
| 2012/0255010 A1* | 10/2012 | Sallam | G06F 21/572 726/24 |
| 2012/0266209 A1 | 10/2012 | Gooding et al. | |
| 2012/0266231 A1* | 10/2012 | Spiers | H04L 63/0218 726/12 |
| 2012/0266252 A1* | 10/2012 | Spiers | H04L 63/0218 726/26 |
| 2012/0324236 A1 | 12/2012 | Srivastava et al. | |
| 2013/0061096 A1 | 3/2013 | McCoy | |
| 2013/0232486 A1* | 9/2013 | Chen | G06F 9/455 718/1 |
| 2013/0276068 A1* | 10/2013 | Alwar | G06F 21/53 726/4 |
| 2013/0340077 A1 | 12/2013 | Salsamendi et al. | |
| 2014/0006803 A1* | 1/2014 | Bodis | G06F 21/125 713/189 |
| 2014/0032920 A1* | 1/2014 | Gehrmann | G06F 21/57 713/176 |
| 2014/0075522 A1* | 3/2014 | Paris | G06F 21/44 726/5 |
| 2014/0075568 A1* | 3/2014 | Sathyadevan | 726/27 |
| 2014/0215461 A1 | 7/2014 | Laor et al. | |
| 2014/0310704 A1 | 10/2014 | Cantu | |
| 2014/0325644 A1 | 10/2014 | Oberg et al. | |
| 2014/0380425 A1 | 12/2014 | Lockett et al. | |
| 2015/0007175 A1* | 1/2015 | Potlapally | G06F 21/57 718/1 |
| 2015/0199518 A1 | 7/2015 | Tokumoto | |

OTHER PUBLICATIONS

Written Opinion of International Searching Authority dated Sep. 26, 2013 in connection with International Patent Application No. PCT/US2013/046481, 7 pages.

Litty, et al.; "Manitou: A Layer-Below Approach to Fighting Malware"; Dept of Computer Science, University of Toronto; Oct. 21, 2006; XP055079350; pp. 6-11.

Specification titled "Methods and Apparatuses for Monitoring Activities of Virtual Machines" filed May 7, 2013; U.S. Appl. No. 13/888,849; 16 pages.

Specification titled "Secure Cloud Hypervisor Monitor" filed Feb. 19 2013; U.S. Appl. No. 13/770,664; 19 pages.

Raytheon Pikewerks Corporation; Second Look; 2013; http//secondlookforensics.com/; 28 pages.

U.S. Office Action issued for U.S. Appl. No. 14/101,257 dated Feb. 2, 2016, 14 pgs.

Office Action dated Sep. 25, 2015 in connection with U.S. Appl. No. 14/101,257, 11 pages.

Office Action dated Sep. 3, 2015 in connection with U.S. Appl. No. 14/101,130, 9 pages.

Final Office Action dated Jan. 22, 2016 in connection with U.S. Appl. No. 14/101,130, 10 pages.

* cited by examiner

HYPERVISOR-BASED BINDING OF DATA TO CLOUD ENVIRONMENT FOR IMPROVED SECURITY

TECHNICAL FIELD

This disclosure is generally directed to computing security. More specifically, this disclosure is directed to hypervisor-based binding of data to a cloud environment for improved security.

BACKGROUND

Computing clouds are increasingly used to provide computing services to client devices. A computing cloud could be used by an organization to provide computing services to internal users of that organization and/or to external users and organizations. In a conventional computing cloud, multiple computing nodes are connected together in a network, and each computing node can execute a "hypervisor." A hypervisor is software and/or hardware that is used to create and manage virtual machines. Each hypervisor supports a virtualization layer, and one or more virtual machines can be executed within the virtualization layer by each computing node. A virtual machine could include an operating system (referred to as a "guest" operating system) and one or more additional software applications that provide desired functionality. It is possible for a single computing node in a computing cloud to execute one or more virtual machines, including multiple virtual machines associated with different guest operating systems.

As is typical with computing clouds, specific virtual machines are not usually bound to particular computing nodes. Rather, each time a client device requests execution of a specific virtual machine, a computing node with adequate resources within the computing cloud could be selected to execute that specific virtual machine.

Security is a constant concern in cloud computing environments. For example, a malicious actor that gains the ability to execute code in a conventional hypervisor or management software of a computing node could obtain a complete image of a virtual machine. The malicious actor could then deploy the copied image of the virtual machine to another environment and reverse-engineer applications or exploit data in the virtual machine as the virtual machine is executing in the other environment.

In one conventional non-cloud-based approach, a software protection program is used in conjunction with an encrypted software application installed on a computing device. The software protection program performs cryptographic operations using data associated with the hardware, software, and physical environment of the computing device to generate a cryptographic key. The cryptographic key is then used to decrypt the software application as the software application is loaded into the memory of the computing device. While effective, this approach is highly restrictive since it binds the software application to a specific machine and prevents execution of the software application on a different machine. This approach is impractical in a cloud computing environment where the computing node that executes a specific virtual machine routinely changes.

SUMMARY

This disclosure provides hypervisor-based binding of data to a cloud environment for improved security.

In a first embodiment, a method includes receiving a request at a first hypervisor from an application within a virtual machine. The virtual machine is executed within a virtualization layer supported by a second hypervisor, and the virtual machine and the hypervisors are executed by a computing node. The method also includes interrupting execution of the application and determining an authorization key using hashing operations performed by the first hypervisor based on measurements associated with the computing node and data associated with the first hypervisor. The method further includes storing the authorization key and resuming execution of the application.

In a second embodiment, an apparatus includes at least one memory and at least one processing device configured to execute a virtual machine, a first hypervisor, and a second hypervisor. The at least one processing device is configured when executing the first hypervisor to receive a request from an application within the virtual machine and interrupt execution of the application. The at least one processing device is also configured when executing the first hypervisor to determine an authorization key, store the authorization key in the at least one memory, and resume execution of the application. The at least one processing device is configured to determine the authorization key using hashing operations performed by the first hypervisor based on measurements associated with the computing node and data associated with the first hypervisor.

In a third embodiment, a non-transitory computer readable medium stores computer readable program code. The computer readable program code when executed causes a computing node to receive a request at a first hypervisor from an application within a virtual machine, where the virtual machine is configured to be executed within a virtualization layer supported by a second hypervisor. The computer readable program code when executed also causes the computing node to interrupt execution of the application and determine an authorization key using hashing operations performed by the first hypervisor based on measurements associated with the computing node and data associated with the first hypervisor. The computer readable program code when executed further causes the computing node to store the authorization key and resume execution of the application.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
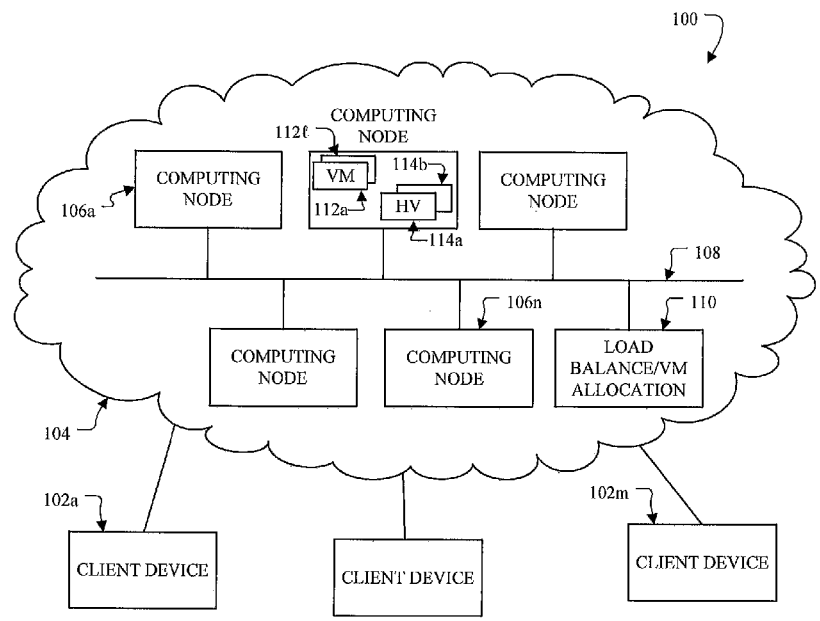
FIG. 1 illustrates an example system with a computing cloud in accordance with this disclosure.

FIG. 1 illustrates an example system 100 with a computing cloud in accordance with this disclosure. The embodiment of the system 100 shown in FIG. 1 is for illustration only. Other embodiments of the system 100 could be used without departing from the scope of this disclosure.

As shown in FIG. 1, the system 100 includes client devices 102a-102m that communicate with or form a part of a computing cloud 104. The client devices 102a-102m represent computing or communication devices that can interact with the computing cloud 104 in order to receive one or more computing services from the computing cloud 104. Any suitable client devices 102a-102m could be used in the system 100, such as desktop computers, laptop computers, tablet computers, dummy computer terminals, smartphones, and any other or additional devices that possess processing and communication capabilities. Any number of client devices could be used in the system 100.

The computing cloud 104 generally represents a cloud computing environment where applications and other software routines are executed to provide computing services to the client devices 102a-102m. The computing cloud 104 typically includes various processing devices that execute instructions in applications and other software routines. The computing cloud 104 also typically includes memory resources used to store data, network interface resources used to communicate over one or more networks, and other computing resources. An application or other software routine could be executed by a single machine within the computing cloud 104 or by multiple machines in the computing cloud 104.

In the example shown in FIG. 1, the computing cloud 104 includes multiple computing nodes 106a-106n coupled together using at least one network 108. The computing cloud 104 also includes at least one load balancing/VM allocation server 110 coupled to the at least one network 108. The computing nodes 106a-106n represent server computers or other type(s) of computing devices that execute applications and other software routines. As described in more detail below, each of the computing nodes 106a-106n can execute one or more virtual machines (VMs) 112a-112l within a virtualization layer that is supported by multiple hypervisors (HVs) 114a-114b.

Each computing node 106a-106n includes any suitable computing resources that can be used to support the execution of applications such as virtual machines 112a-112l and hypervisors 114a-114b. For example, each computing node 106a-106n could include one or more processing devices, one or more memories, and one or more network interfaces.

The at least one network 108 facilitates communication between the computing nodes 106a-106n and other components of the system 100, such as the client devices 102a-102m. For example, the network(s) 108 may communicate Internet Protocol (IP) packets, frame relay frames, Asynchronous Transfer Mode (ATM) cells, or other information between network addresses. The network(s) 108 may include one or more local area networks (LANs), metropolitan area networks (MANs), wide area networks (WANs), all or a portion of a global network such as the Internet, or any other communication system or systems at one or more locations. Any number of networks 108 in any suitable configuration could be used. For instance, the client devices 102a-102m could access the computing cloud 104 over a public network such as the Internet, while the computing nodes 106a-106n and other components of the computing cloud 104 could communicate over one or more private LANs or other private networks.

The at least one load balancing/VM allocation server 110 performs various functions that support the use or operation of the computing cloud 104. For example, the load balancing/VM allocation server 110 can perform load balancing to distribute workloads across the computing nodes 106a-106n. Part of this functionality can include the load balancing/VM allocation server 110 selecting the computing nodes 106a-106n that are to execute various virtual machines 112a-112l requested by the client devices 102a-102m. The load balancing/VM allocation server 110 includes any suitable structure for managing or controlling the workload on multiple devices.

Each virtual machine 112a-112l represents a virtualized computer or other software-based virtualization of a machine that can be executed for or on behalf of at least one client device 102a-102m. Each virtual machine 112a-112l could include a guest operating system and one or more additional software applications. Example guest operating systems could include LINUX, HP-UX, MICROSOFT WINDOWS SERVER, and other operating systems. Other applications within a virtual machine 112a-112l could include any suitable applications that provide desired functionality for the client devices 102a-102m. Each virtual machine 112a-112l could include one or multiple applications.

The hypervisors 114a-114b in each computing node 106a-106n generally operate to support the creation of a virtualization layer to support the execution of one or more virtual machines 112a-112l and to oversee the integrity of the virtualization layer. For example, the hypervisors 114a-114b can operate to virtualize the hardware resources of a computing node 106a-106n on which the virtual machines 112a-112l are executed. This allows the virtual machines 112a-112l to execute on different computing nodes 106a-106n with little or no regard for the different hardware configurations and resources of the computing nodes 106a-106n.

As described in more detail below, a computing node 106a-106n could include both a monitoring hypervisor 114a and an additional hypervisor 114b. The additional hypervisor 114b can support the virtualization layer and interact with hardware resources of the computing node. The monitoring hypervisor 114a can perform functions to verify the integrity of both of the hypervisors 114a-114b, the virtual machines 112a-112l, and the underlying computing node 106a-106n, such as by performing cryptographic operations using data associated with the hardware of a particular computing node 106a-106n. An application within a virtual machine 112a-112l can use data provided by the monitoring hypervisor 114a (such as an authorization key) to verify whether the underlying computing node 106a-106n is authorized to execute the virtual machine 112a-112l or a function of the virtual machine 112a-112l. If not, execution of the virtual machine 112a-112l or the function of the virtual machine 112a-112l can be disabled or stopped.

Using measurements of the hardware of a particular computing node 106a-106n, that computing node's additional hypervisor 114b, and a specific virtual machine, a monitoring hypervisor 114a on that computing node can help to verify that the specific computing node 106a-106n has not been compromised. An application in the specific virtual machine could then use data from the monitoring hypervisor 114a on that computing node to verify that the virtual machine can be executed on that computing node. The same operations can be performed when another computing node 106a-106n attempts to execute the same virtual machine.

By performing these actions, the monitoring hypervisors 114a in the computing nodes 106a-106n help to bind the virtual machines 112a-112l to the cloud environment. More precisely, the monitoring hypervisors 114a in the computing nodes 106a-106n bind the virtual machines 112a-112l to the monitoring hypervisors 114a, which thereby binds the virtual machines 112a-112l to the computing cloud 104. A virtual machine 112a-112l itself or a function of the virtual machine 112a-112l may not be executed unless valid data is obtained from a monitoring hypervisor 114a on a computing node. Since each monitoring hypervisor 114a can perform certain functions (such as hardware and software measurement operations) that bind the monitoring hypervisor 114a to a specific computing node in the computing cloud 104, this can help to bind the virtual machines 112a-112l to the cloud environment. If a virtual machine 112a-112l is copied onto a different platform, the virtual machine 112a-112l may shut down or refuse to execute an application since it does not receive the correct data from an underlying hypervisor 114a. Moreover, the monitoring hypervisors 114a can help to ensure that the underlying computing nodes have not been compromised. Note that while described as being used to bind a virtual machine 112a-112l to a cloud environment, the same or similar process could be used to bind any other suitable applications or data to a cloud environment.

Although FIG. 1 illustrates one example of a system 100 with a computing cloud 104, various changes may be made to FIG. 1. For example, the system 100 could include any number of each component in any suitable arrangement. Cloud computing networks can vary widely in configuration, and FIG. 1 does not limit the scope of this disclosure to any particular configuration. While FIG. 1 illustrates one operational environment in which data can be bound to a cloud environment, this functionality could be used in any other suitable system.

Figure 2:
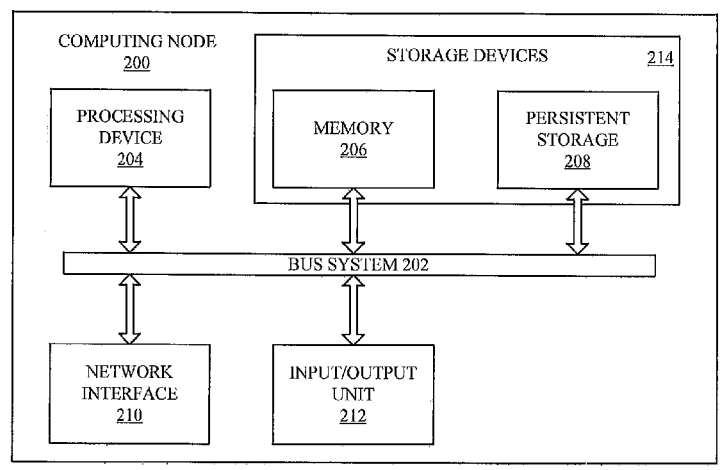
FIG. 2 illustrates an example computing node within a computing cloud in accordance with this disclosure.

FIG. 2 illustrates an example computing node 200 within a computing cloud in accordance with this disclosure. The computing node 200 could, for example, be used as the computing nodes 106a-106n in the system 100 of FIG. 1. The embodiment of the computing node 200 shown in FIG. 2 is for illustration only. Other embodiments of the computing node 200 could be used without departing from the scope of this disclosure.

As shown in FIG. 2, the computing node 200 includes a bus system 202, which supports communication between at least one processing device 204, at least one memory 206, at least one persistent storage device 208, and at least one network interface 210. At least one input/output (I/O) unit 212 could optionally be provided at the computing node 200, although the computing node 200 could also be accessed and used remotely (such as via a network interface 210) without the need for a local I/O unit 212.

The at least one processing device 204 processes instructions in software, such as software that is loaded into the memory 206. The processing device(s) 204 may include one or more microprocessors, multi-core processors, microcontrollers, field programmable gate arrays, application specific integrated circuits, discreet logic, or other type(s) of processing device(s) depending on the implementation. As a particular example, the processing devices 204 may be implemented using a number of heterogeneous processor systems in which a main processor is present with secondary processors on a single chip. As another particular example, the processing devices 204 may be a symmetric multiprocessor system containing multiple processors of the same type.

The at least one memory 206 and the at least one persistent storage device 208 are examples of storage devices 214. A storage device is any piece of hardware capable of storing information, such as data, program code, and/or other suitable information on a temporary or permanent basis. The memory or memories 206 here may include, for example, a random access memory or any other suitable volatile and/or non-volatile storage device(s). The persistent storage device(s) 208 may contain one or more components or devices such as a read-only memory, hard drive, Flash memory, optical drive, or any other type(s) of persistent storage device(s). The media used by a persistent storage device 208 may be removable, such as when a removable hard drive is used as the persistent storage device 208.

The at least one network interface 210 supports communication with other systems or devices. For example, a network interface 210 could include a network interface card or a wireless transceiver. A network interface 210 may support the exchange of any suitable information, such as data associated with execution of a virtual machine or a hypervisor. Each network interface 210 may support communication through one or more physical or wireless communications links.

The at least one I/O unit 212 allows for input and/or output of data using other devices that may be connected to the computing node 200. For example, an I/O unit 212 may provide a connection for user input through a keyboard, mouse, or other suitable input device(s). The I/O unit 212 may also send output data to a display, printer, or other suitable output device(s).

Program code for an operating system, applications, or other programs can be stored in one or more of the storage devices 214, provided to the processing device(s) 204, and executed by the processing device(s) 204. The applications executed by the processing device(s) 204 can include applications implementing hypervisors and virtual machines. Example details regarding the use of hypervisors and virtual machines are described below with respect to FIGS. 3 through 5. These details can be implemented within the computing node 200.

Although FIG. 2 illustrates one example of a computing node 200 within a computing cloud, various changes may be made to FIG. 2. For example, as with computing clouds, computing nodes can vary widely in configuration, and FIG. 2 does not limit the scope of this disclosure to any particular configuration. While FIG. 2 illustrates one example of a computing node that can operate within a cloud computing environment, any other suitable computing node(s) could be used.

Figure 3:
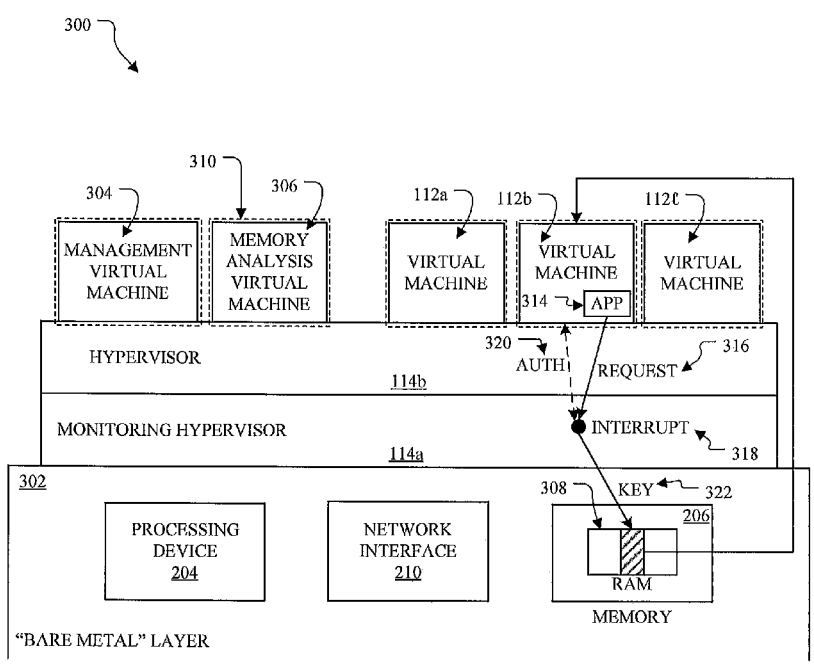
FIG. 3 illustrates an example functional architecture supporting hypervisor-based binding of data to a cloud environment in accordance with this disclosure.

FIG. 3 illustrates an example functional architecture 300 supporting hypervisor-based binding of data to a cloud environment in accordance with this disclosure. The embodiment of the functional architecture 300 shown in FIG. 3 is for illustration only. Other embodiments of the functional architecture could be used without departing from the scope of this disclosure. Also, for ease of explanation, the functional architecture 300 shown in FIG. 3 is described with respect to the computing node 200 of FIG. 2 operating in the system 100 of FIG. 1. The functional architecture 300 shown in FIG. 3 could be used with any other computing node and in any other system.

As shown in FIG. 3, a "bare metal" layer 302 represents the physical computing resources of an underlying computing node 200. The "bare metal" layer 302 here includes the various processing devices 204, memories 206, and network interfaces 210 of the computing node 200. The "bare metal" layer 302 could include any other computing resources in a computing cloud or a computing node.

The monitoring hypervisor 114a and the additional hypervisor 114b are executed by or otherwise implemented with the computing node 200. The hypervisor 114b generally supports the creation and management of a virtualization layer in which one or more virtual machines can be executed. The hypervisor 114b also generally supports interactions between those virtual machines and the computing resources in the underlying "bare metal" layer 302.

The monitoring hypervisor 114a can monitor the operation of the virtual machine(s) and the hypervisor 114b to thereby oversee the integrity of the virtualization layer. For example, the monitoring hypervisor 114a could capture memory snapshots of the memory space used by the virtual machine(s) in the memory 206 to support real-time behavior-based malware detection. Details of example monitoring hypervisors and example techniques for detecting malware using monitoring hypervisors can be found in U.S. patent application Ser. No. 13/770,664 and U.S. patent application Ser. No. 13/888,849, both of which are hereby incorporated by reference in their entirety. In this example, the monitoring hypervisor 114a can logically operate between the bare metal layer 302 and the hypervisor 114b.

Each hypervisor 114a-114b can be implemented in any suitable manner. For example, each hypervisor 114a-114b could include software/firmware instructions executed by at least one processing device. In some embodiments, each hypervisor 114a-114b represents a "Type 1" or "Type 2" hypervisor. A "Type 1" hypervisor represents a hypervisor run or executed directly on the underlying hardware of a computing node in order to control the hardware. A "Type 2" hypervisor represents a hypervisor run or executed between the operating system of a computing node and one or more guest operating systems in one or more virtual machines. In other words, a "Type 2" hypervisor runs within the environment created by the operating system of a computing node, while a "Type 1" hypervisor is not limited in this manner. Examples of available hypervisors that could be used as the hypervisor 114a and/or the hypervisor 114b (after augmented to support the functionality described in this patent document) include the XEN hypervisor from CITRIX SYSTEMS, INC., the ESXI hypervisor from VMWARE, INC., and the KVM hypervisor from RED HAT, INC. Note, however, that other hypervisors could also be used.

In the example shown in FIG. 3, different types of virtual machines are executed on the computing node 200. For example, the computing node 200 could execute the one or more virtual machines 112a-112l. The virtual machines 112a-112l represent virtual machines used to provide one or more services to the client devices 102a-102m. The virtual machines 112a-112l could be created and controlled by the organization operating the computing cloud 104, by the owners/operators of the client devices 102a-102m, or in any other suitable manner. Each virtual machine 112a-112l can include a guest operating system and one or more applications.

The computing node 200 could also execute a management virtual machine 304. The management virtual machine 304 can perform various functions used to manage the operation of the computing node 200. The functions of the management virtual machine 304 may not necessarily be intended to directly provide functionality to the client devices 102a-102m but rather to manage the computing node 200 or support execution of the virtual machines 112a-112l. Example management functions could include memory management and network management.

In addition, the computing node 200 could execute a memory analysis virtual machine 306. The memory analysis virtual machine 306 performs memory analysis operations to detect malware and other security threats associated with the computing node 200. For example, the virtual machine 306 could analyze snapshots of data contained within a random access memory (RAM) 308 of the computing node 200 during live analysis. The virtual machine 306 could also store snapshots of the RAM 308 for later forensic or other analysis. The snapshots used by the virtual machine 306 could be captured by the underlying monitoring hypervisor 114a. In some embodiments, the virtual machine 306 could analyze the contents of the RAM 308 to enforce a whitelist identifying software that can be executed by the computing node 200 or a blacklist identifying software that cannot be executed by the computing node 200. The memory analysis virtual machine 306 includes any suitable logic for analyzing memory, such as the SECOND LOOK tool from RAYTHEON PIKEWERKS CORP.

The dashed lines 310 around the virtual machines in FIG. 3 represent software protection provided to the virtual machines. In some embodiments, protection for a virtual machine can be provided using an application 314 in or associated with that virtual machine. Note that while one virtual machine 112b here is shown as including the application 314, one, some, or all of the virtual machines executed by a computing node 200 could include the application 314 and receive software protection.

Any suitable encryption technology could be used to protect a virtual machine. In the example shown in FIG. 3, the application 314 in a virtual machine can use an authorization key generated by an underlying monitoring hypervisor 114a to decrypt other data within the virtual machine and verify whether the virtual machine can be executed on a specified computing node. The monitoring hypervisor 114a could use hardware attributes pertaining to the BIOS, PCI bus, CPU, or other resources of a computing node to determine the authorization key. The hardware attributes typically include information such as the manufacturer and version-related information of a system resource.

The application 314 can determine whether an authorization key is valid and, if so, execute a function of the application 314 or another application. An application 314 could represent an application to be executed in order to provide some type of service to a client device 102a-102m. An application 314 could also represent a security or management application that can trigger execution of another application, such as by using data decrypted using the authorization key from the monitoring hypervisor 114a. Additional details regarding the operation of the application 314 and the monitoring hypervisor 114a in a computing node 200 are shown in FIGS. 4 and 5.

Note that the various components shown in FIG. 3 could be implemented in any suitable manner. For example, each of the components 112a-112l, 114a-114b, 304-306, 312-314 could be implemented using software/firmware that is executed by the processing device(s) 204 of the computing node 200. Also, as noted above, while described as being used to bind a virtual machine to a cloud environment, the same or similar process could be used to bind any other suitable data to a cloud environment.

Although FIG. 3 illustrates one example of a functional architecture 300 supporting hypervisor-based binding of data to a cloud environment, various changes may be made to FIG. 3. For example, the computing node 200 could include any number(s) and type(s) of resources in the bare metal layer 302, and the computing node 200 could execute any number(s) and type(s) of virtual machines. Also, while the use of a RAM 308 is shown here to support data exchange, data can be transferred using any other suitable memory.

Figure 4:
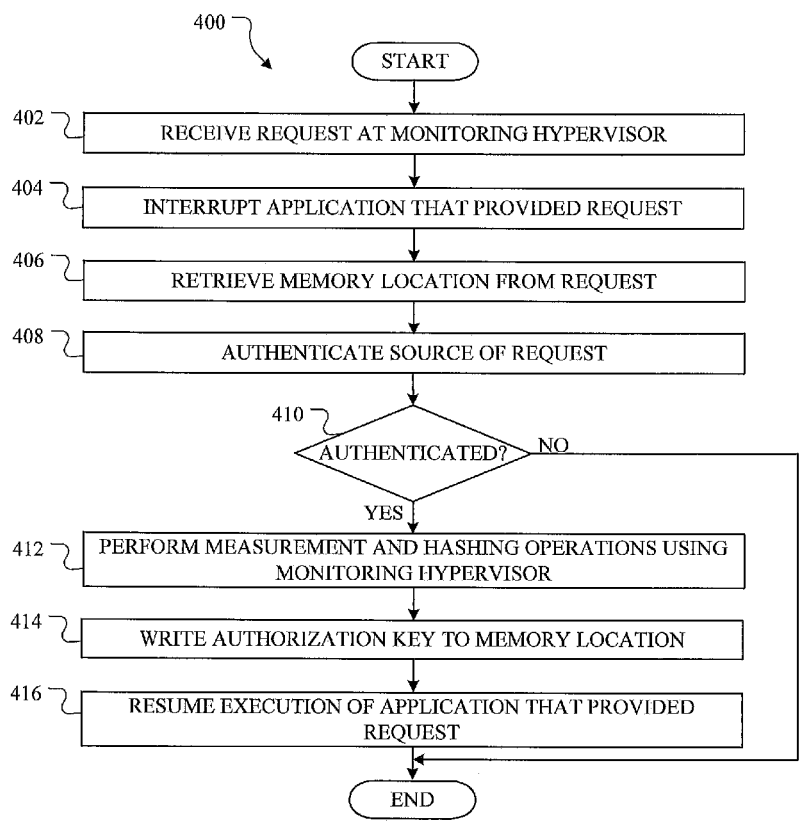
FIGS. 4 and 5 illustrate example methods for hypervisor-based binding of data to a cloud environment in accordance with this disclosure.
Figure 5:
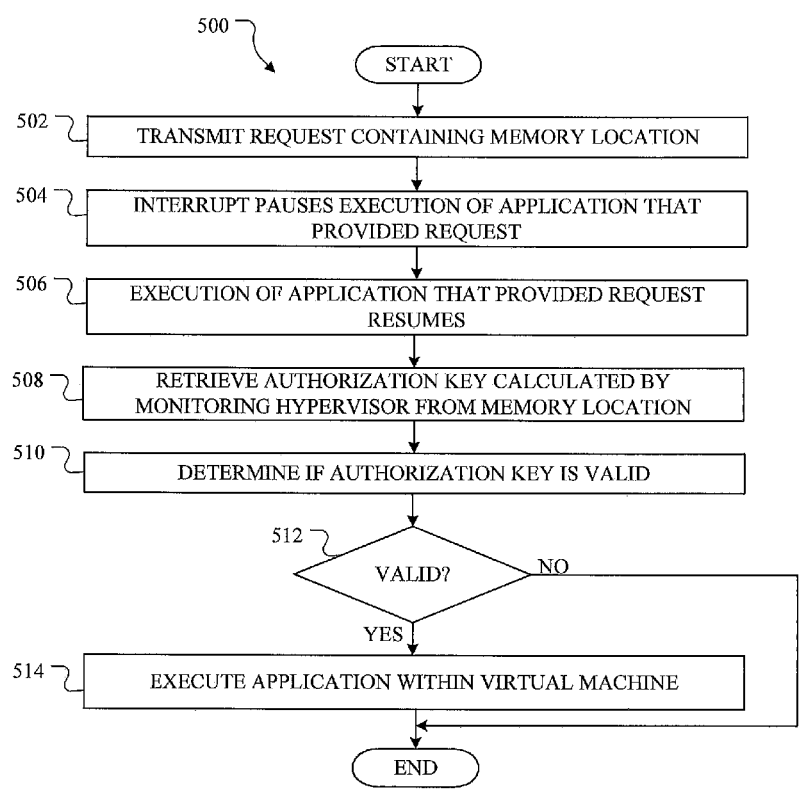

FIGS. 4 and 5 illustrate example methods for hypervisor-based binding of data to a cloud environment in accordance with this disclosure. More specifically, FIG. 4 illustrates an example method 400 that could be performed by the monitoring hypervisor 114a, and FIG. 5 illustrates an example method 500 that could be performed by a virtual machine (such as virtual machine 112b). The embodiments of the methods 400 and 500 shown in FIGS. 4 and 5 are for illustration only. Other embodiments of the methods 400 and 500 could be used without departing from the scope of this disclosure. Also, for ease of explanation, the methods 400 and 500 are described with respect to the computing node 200 of FIG. 2 using the functional architecture 300 of FIG. 3 and operating in the system 100 of FIG. 1. The methods 400 and 500 could be used with any other computing node, functional architecture, and system.

As shown in FIG. 4, a request is received at a monitoring hypervisor at step 402. This could include, for example, the monitoring hypervisor 114a receiving a request message 316 (which could be referred to as a "VM call") from the application 314 in the virtual machine 112b as shown in FIG. 3. The request message 316 could be related to any desired function of the virtual machine 112b, such as a request to use computing node resources to execute the application 314 or another application in the virtual machine 112b. The request message 316 can include various information from the virtual machine 112b, such as a memory address and any data to be used by the monitoring hypervisor 114a during a hashing operation. The memory address can represent a location in memory 206 that is "owned" by the virtual machine 112b and that defines where the virtual machine 112b expects to retrieve an authorization key to be generated by the monitoring hypervisor 114a. The application 314 here could represent a security, management, or other application that allows itself or another application to execute if the authorization key received from the monitoring hypervisor 114a via the memory 206 is valid. In the example shown in FIG. 3, the memory address for the authorization key is located in the RAM 308, although it could be located in any other suitable type of memory (such as a processing device's general purpose register or other data register).

Execution of the application that provided the request is interrupted at step 404. This could include, for example, the monitoring hypervisor 114a generating an interrupt 318 as shown in FIG. 3. This pauses the execution of the requesting application 314 by the computing node 200 and allows the monitoring hypervisor 114a time to perform various functions in order to generate an authorization key for the requesting application 314.

A memory location is retrieved from the request at step 406. This could include, for example, the monitoring hypervisor 114a identifying a memory location in the RAM 308 or other memory location contained in the request message 316. This step could optionally include retrieving other data from the request message 316, such as data to be used during a hashing operation to be performed by the monitoring hypervisor 114a.

A source of the request is authenticated at step 408. This could include, for example, the monitoring hypervisor 114a performing an authentication operation 320 with the application 314 or the virtual machine 112b as shown in FIG. 3. Any suitable authentication technique could be used here. For example, the application 314 could provide a digital certificate or a pointer identifying a digital certificate. The monitoring hypervisor 114a could also determine whether the request message 316 was obtained from a memory address "owned" by the application 314. The monitoring hypervisor 114a could further examine an instruction pointer of the processing device 204 and determine if the processing device 204 was executing code of the virtual machine 112b or the application 314 at the time that the request message 316 was issued. Note that the authentication operation 320 could be separate from or form a part of other steps in FIG. 4. For instance, the request message 316 could include a certificate or a pointer to a certificate of the application 314 or the virtual machine 112b, or the certificate or the pointer to the certificate could be sent to the monitoring hypervisor 114a separate from the request message 316.

If the source is not authenticated at step 410, the method 400 may end. In this case, the monitoring hypervisor 114a has determined that it received an invalid request, and the monitoring hypervisor 114a can take any suitable action (such as discarding the request, warning an operator, triggering an alarm, ignoring future requests from the message source, or disabling execution of the message source).

If the source is authenticated at step 410, measurement and hashing operations are performed by the monitoring hypervisor at step 412. One goal of the measurement and hashing operations is to verify the integrity of the monitoring hypervisor itself and to confirm whether execution of an application is allowed on the underlying computing node. For example, the monitoring hypervisor 114a could perform a hashing operation based on measurements associated with system resources of the computing node 200, a unique identifier of the monitoring hypervisor 114a, and data contained in the request message 316 (or any combination thereof). The unique identifier of the monitoring hypervisor 114a could represent any suitable information, such as an image of the monitoring hypervisor 114a, an encryption key of the hypervisor 114a, or information from a Trusted Platform Module (TPM) chip to which the monitoring hypervisor 114a is bound. The measurements associated with system resources could include hardware attributes pertaining to the BIOS, PCI bus, CPU, or other resources of a computing node. As a particular example, the monitoring hypervisor 114a could implement a Secure Hash Algorithm-1 (SHA-1), SHA-2, or other hashing function.

The result of the measurement and hashing operations performed by the monitoring hypervisor represents an authorization key that is written to the memory location identified in the request at step 414. This could include, for example, the monitoring hypervisor 114a storing an authorization key 322 in the RAM 308.

Execution of the application that provided the request is resumed at step 416. This could include, for example, the monitoring hypervisor 114a advancing the instruction pointer for the application 314 to the next instruction of the application 314 and allowing the processing device 204 to resume execution of the thread for the application 314.

As shown in FIG. 5, a request with a memory location is transmitted at step 502. This could include, for example, the application 314 in the virtual machine 112b transmitting the request message 316, such as when the virtual machine 112b attempts to execute the application 314 or another application that requires computing node resources. The request message 316 could include a memory address in the RAM 308 or other suitable location. An interrupt pauses execution of the application that provided the request at step 504, and after some period of time execution of the application that provided the request resumes at step 506.

An authorization key determined by a monitoring hypervisor is retrieved from the memory location at step 508. This could include, for example, the virtual machine 112b retrieving the authorization key 322 from the RAM 308 or other location. The authorization key 322 here is the key generated by the monitoring hypervisor 114a using the hashing operation.

A determination is made whether the authorization key is valid at step 510. The application 314 can determine whether the authorization key 322 is valid in any suitable manner. For example, the application 314 could have access to encrypted data, such as an encrypted identifier, and the application 314 could attempt to decrypt the encrypted data using the authorization key 322. If the decrypted identifier matches an expected identifier, the application 314 can confirm that the monitoring hypervisor 114a provided a valid authorization key 322 and therefore the computing node 200 is a valid platform on which the application 314 or another application can be executed. Note, however, that the application 314 could use the authorization key in any other suitable manner, such as to decrypt an encryption key that is itself used to decrypt other data.

If the authorization key is not valid at step 512, the method 500 could end, and the virtual machine 112b can take any suitable action. Example actions could include shutting down the application 314 or the virtual machine 112b, discarding the authorization key, warning an operator, triggering an alarm, or refusing to provide additional requests to the same hypervisor.

Otherwise, a valid authorization key has been obtained, indicating that the monitoring hypervisor 114a is a valid hypervisor and has provided an indication that the virtual machine 112b can be executed on its current platform. As a result, an application within the virtual machine is executed at step 514. The application executed here could be the same application 314 that provided the request message 316 or a different application.

In this manner, the monitoring hypervisor 114a can help to bind the virtual machine 112b to a specified cloud environment. For example, the virtual machine 112b may be unable to execute an application unless a valid authorization key 322 is obtained from the underlying monitoring hypervisor 114a. The underlying monitoring hypervisor 114a may only be able to generate a valid authorization key 322 if it is executed on an authorized computing node 200 that contains or can provide the expected measurement data.

Note that while a single request message 316 is shown in FIG. 3 and described in FIGS. 4 and 5, multiple messages 316 could be provided by the application 314 and received by the monitoring hypervisor 114a. The monitoring hypervisor 114a could provide an authorization key 322 in response to one, some, or all of these requests. Also, while described as handling a request from one virtual machine 112b, the monitoring hypervisor 114a on a computing node 200 could handle requests from any number of virtual machines.

Although FIGS. 4 and 5 illustrate examples of methods 400 and 500 for hypervisor-based binding of data to a cloud environment, various changes may be made to FIGS. 4 and 5. For example, while each figure shows a series of steps, various steps in each figure could overlap, occur in parallel, occur in a different order, or occur any number of times. Also, the above description has described the storage of an authorization key 322 in a memory location identified by a request message 316. However, an authorization key 322 could be transferred from a hypervisor 114a to a virtual machine using a fixed hardwired memory location, a secure communication link, or in any other suitable manner.

In some embodiments, various functions described above (such as functions of the various hypervisors, software protection modules, and virtual machines) are implemented or supported by computer programs, each of which is formed from computer readable program code and embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any, other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
 receiving a request at a first hypervisor from an application within a virtual machine, the virtual machine executed within a virtualization layer supported by a second hypervisor, the virtual machine and the hypervisors executed by a computing node;
 interrupting execution of the application within the virtual machine;

determining, while the application within the virtual machine is interrupted, an authorization key using hashing operations performed by the first hypervisor based on measurements associated with the computing node and data associated with the first hypervisor, wherein the measurements associated with the computing node comprise at least one hardware attribute associated with the computing node;

storing the authorization key in at least one memory;

resuming execution of the application;

receiving, by the virtual machine, the authorization key from the at least one memory;

determining whether the authorization key is valid; and if the authorization key is valid, executing a function of the application or a second application within the virtual machine.

2. The method of claim 1, wherein determining whether the authorization key is valid comprises:

decrypting encrypted data using the authorization key; and determining whether the decrypted data matches expected data.

3. The method of claim 1, wherein the authorization key is determined using a unique identifier associated with the first hypervisor.

4. The method of claim 3, wherein the authorization key is further determined using data from the request.

5. The method of claim 3, wherein the unique identifier associated with the first hypervisor comprises at least one of:

an image of the first hypervisor;

an encryption key associated with the first hypervisor; and information from a Trusted Platform Module (TPM) chip to which the first hypervisor is bound.

6. The method of claim 1, further comprising:

authenticating a source of the request at the first hypervisor.

7. The method of claim 1, wherein:

the request identifies a specified memory location in the at least one memory; and storing the authorization key comprises storing the authorization key at the specified memory location.

8. The method of claim 1, further comprising:

performing the receiving, interrupting, determining, storing, and resuming steps at each of multiple computing nodes in a computing cloud, each computing node executing first and second hypervisors; and wherein the first hypervisors in the computing nodes bind the virtual machine to the computing cloud so that the function of the application or the second application within the virtual machine cannot be executed outside the computing cloud.

9. An apparatus comprising:

at least one memory; and at least one processing device configured to execute a virtual machine, a first hypervisor, and a second hypervisor, wherein the at least one processing device is configured when executing the first hypervisor to:

receive a request from an application within the virtual machine;

interrupt execution of the application within the virtual machine;

determine, while the application within the virtual machine is interrupted, an authorization key using hashing operations performed by the first hypervisor based on measurements associated with the apparatus and data associated with the first hypervisor, wherein the measurements associated with the apparatus comprise at least one hardware attribute associated with the apparatus;

store the authorization key in the at least one memory;

resume execution of the application;

receive, for use by the virtual machine, the authorization key from the at least one memory;

determine whether the authorization key is valid; and if the authorization key is valid, execute a function of the application or a second application within the virtual machine.

10. The apparatus of claim 9, wherein the at least one processing device is configured to determine whether the authorization key is valid by:

decrypting encrypted data using the authorization key; and determining whether the decrypted data matches expected data.

11. The apparatus of claim 9, wherein the at least one processing device is configured to determine the authorization key using a unique identifier associated with the first hypervisor.

12. The apparatus of claim 11, wherein the at least one processing device is configured to determine the authorization key using data from the request.

13. The apparatus of claim 11, wherein the unique identifier associated with the first hypervisor comprises at least one of:

an image of the first hypervisor;

an encryption key associated with the first hypervisor; and information from a Trusted Platform Module (TPM) chip to which the first hypervisor is bound.

14. The apparatus of claim 9, wherein the at least one processing device is further configured when executing the first hypervisor to authenticate a source of the request.

15. The apparatus of claim 9, wherein:

the request identifies a specified memory location in the at least one memory; and the at least one processing device is configured to store the authorization key at the specified memory location.

16. A non-transitory computer readable medium storing computer readable program code that when executed causes a computing node to:

receive a request at a first hypervisor from an application within a virtual machine, the virtual machine configured to be executed within a virtualization layer supported by a second hypervisor;

interrupt execution of the application within the virtual machine;

determine, while the application within the virtual machine is interrupted, an authorization key using hashing operations performed by the first hypervisor based on measurements associated with the computing node and data associated with the first hypervisor, wherein the measurements associated with the computing node comprise at least one hardware attribute associated with a bus of the computing node;

store the authorization key in at least one memory;

resume execution of the application;

receive, by the virtual machine, the authorization key from the at least one memory;

determine whether the authorization key is valid; and if the authorization key is valid, execute a function of the application or a second application within the virtual machine.

17. The non-transitory computer readable medium of claim 16, wherein the computer readable program code that when executed causes the computing node to determine the authorization key comprises:
   computer readable program code that when executed causes the computing node to determine the authorization key using a unique identifier associated with the first hypervisor.

18. The method of claim 1, wherein the at least one hardware attribute associated with the bus of the computing node comprises information associated with a manufacturer of a bus of the computing node.

19. The non-transitory computer readable medium of claim 16, wherein the computer readable program code that when executed causes the computing node to determine whether the authorization key is valid comprises:
   computer readable program code that when executed causes the computing node to:
      decrypt encrypted data using the authorization key; and
      determine whether the decrypted data matches expected data.

20. The non-transitory computer readable medium of claim 17, wherein the computer readable program code when executed further causes the computer node to determine the authorization key using data from the request.

21. The non-transitory computer readable medium of claim 17, wherein the unique identifier associated with the first hypervisor comprises at least one of:
   an image of the first hypervisor;
   an encryption key associated with the first hypervisor; and
   information from a Trusted Platform Module (TPM) chip to which the first hypervisor is bound.

* * * * *